US011067061B2

(12) United States Patent
Bertolotti

(10) Patent No.: US 11,067,061 B2
(45) Date of Patent: Jul. 20, 2021

(54) METHOD FOR PITCH ANGLE MEASUREMENT AND/OR FOR CONSTRUCTING A PITCH ANGLE MEASUREMENT SYSTEM

(71) Applicant: NIDEC SSB WIND SYSTEMS GMBH, Salzbergen (DE)

(72) Inventor: Fabio Bertolotti, Bad Bentheim (DE)

(73) Assignee: NIDEC SSB WIND SYSTEMS GMBH, Salzbergen (DE)

( * ) Notice: Subject to any disclaimer, the term of this patent is extended or adjusted under 35 U.S.C. 154(b) by 120 days.

(21) Appl. No.: 16/317,477

(22) PCT Filed: Jul. 26, 2017

(86) PCT No.: PCT/EP2017/068878
§ 371 (c)(1),
(2) Date: Jan. 11, 2019

(87) PCT Pub. No.: WO2018/028987
PCT Pub. Date: Feb. 15, 2018

(65) Prior Publication Data
US 2019/0226457 A1     Jul. 25, 2019

(30) Foreign Application Priority Data

Aug. 6, 2016   (EP) ..................... 16183144

(51) Int. Cl.
 *F03D 17/00*          (2016.01)
(52) U.S. Cl.
 CPC .......... *F03D 17/00* (2016.05); *F05B 2260/74* (2013.01); *F05B 2270/328* (2013.01)
(58) Field of Classification Search
 None
 See application file for complete search history.

(56) References Cited

U.S. PATENT DOCUMENTS 8,585,948 B2 * 11/2013 Flach ................. F03D 13/10
264/154
2010/0121606 A1 * 5/2010 Vestergaard ........... G01C 15/00
702/167

(Continued)

FOREIGN PATENT DOCUMENTS

EP        2896827 A1    7/2015
WO    WO-2010017820 A2   2/2010

OTHER PUBLICATIONS

International Search Report (in English and German) and Written Opinion of the International Searching Authority (in German) issued in PCT/EP2017/068878, dated Nov. 7, 2017; ISA/EP.

*Primary Examiner* — Juan G Flores
(74) *Attorney, Agent, or Firm* — Harness, Dickey & Pierce, P.L.C.

(57) ABSTRACT

The invention relates to a method for pitch angle measurement and/or for constructing a pitch angle measurement system on a rotor blade (100) of a wind turbine, the rotor blade comprising a blade root (114) and extending along a longitudinal blade axis (180). The rotor blade is rotatably mounted, by its blade root (114), to rotate about the longitudinal blade axis (180), on a rotor hub (20) of the wind turbine, the rotor hub rotating or being rotatable about a rotor axis (36). At least one chord line direction indicator (430) is firmly connected to the rotor blade (100) at a distance from the blade root (114), and defines a chord line direction indicator direction (160) indicative of a direction of a chord line (140) of the rotor blade (100) at the location of the chord line direction indicator (430). The rotor blade (100), or at least one rotor blade portion (101) of the rotor blade firmly connected to the chord line direction indicator (430), is produced in a mould (200) before being connected to the chord line direction indicator (430). While the rotor blade (100) or rotor blade portion (101) is in the mould (Continued)

Figure 1:
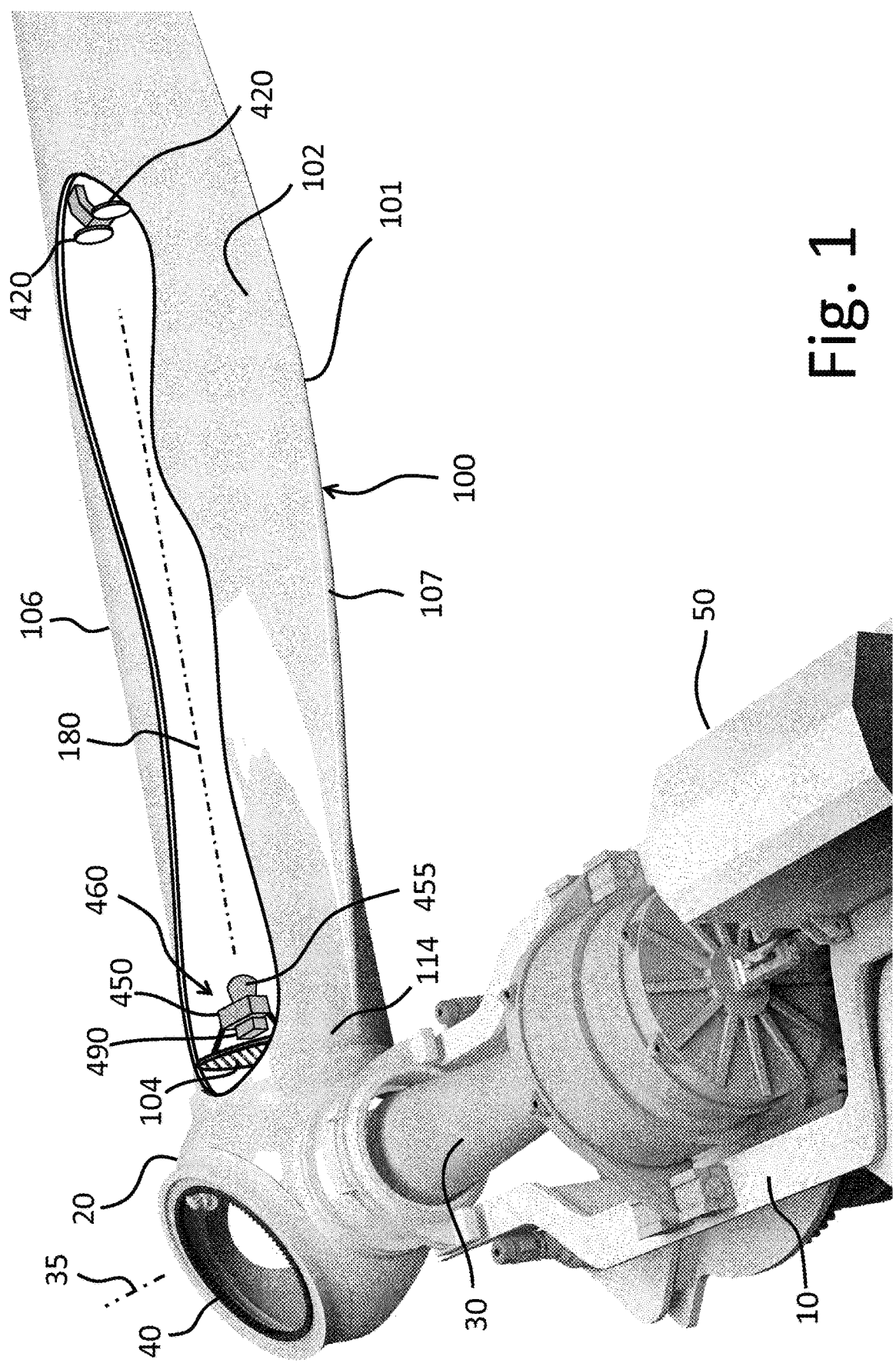

(200), the chord line direction indicator (430) is firmly connected to the rotor blade (100) or rotor blade portion (101) in a position which is defined relative to the mould (200).

15 Claims, 13 Drawing Sheets

(56) References Cited

U.S. PATENT DOCUMENTS

2011/0285129 A1 11/2011 Li et al.
2013/0302161 A1 11/2013 Koerber et al.

* cited by examiner

METHOD FOR PITCH ANGLE MEASUREMENT AND/OR FOR CONSTRUCTING A PITCH ANGLE MEASUREMENT SYSTEM

The invention relates to a method for pitch angle measurement and/or for constructing a pitch angle measurement system on a rotor blade of a wind turbine, the rotor blade comprising a blade root and extending along a longitudinal blade axis, the rotor blade being rotatably mounted, by its blade root, to rotate about the longitudinal blade axis, on a rotor hub of the wind turbine, the rotor hub rotating or being rotatable about a rotor axis, wherein at least one chord direction indicator firmly connected to the rotor blade at a distance from the blade root and defines a chord direction indicator direction indicative of a direction of a chord of the rotor blade at the location of the chord direction indicator, by means of at least one torsion angle detection unit a torsion angle of the rotor blade is detected, by which the chord direction indicator direction is rotated relative to a chord direction indicator reference direction, by means of a blade root angle detection unit a blade root angle is detected, by which the blade root is rotated relative to a blade root reference position about the longitudinal blade axis, and by means of an evaluation unit on the basis of the torsion angle and the blade root angle a pitch angle of the rotor blade at the location of the chord direction indicator is determined, wherein the rotor blade or at least one rotor blade portion of the rotor blade firmly connected to the chord direction indicator is produced in a mould before being connected to the chord direction indicator.

A rotor blade of a wind turbine forms a slim structure with a blade root and blade cross sections along a longitudinal blade axis. The distance along the longitudinal blade axis, measured starting from the blade root is referred to here as the spaced position. Each blade cross section is associated with a chord direction, represented by a line, which joins the front edge of the airfoil with the rear edge of the airfoil. A representative chord direction for the rotor blade is defined as the chord direction in a predetermined spaced position.

A rotor hub is secured non-rotatably to a rotor shaft of the wind turbine, wherein the rotor shaft rotates relative to a machine support and drives an electric generator secured to the machine support. The rotation of the rotor shaft and thus of the rotor hub defines a main rotational speed vector of the wind turbine. In large wind turbines which, by way of example, are also referred to as multi-megawatt turbines, each rotor blade is rotatably mounted by its blade root by means of a blade bearing on the rotor hub, to allow a rotation of the rotor blade relative to the rotor hub about the longitudinal blade axis by the blade root. This rotation allows the angle of incidence of the rotor blade to be varied. Varying the angle of incidence varies the lifting forces and flow resistances attacking and/or acting upon the rotor blade and thus also the loads transmitted from the rotor blade to the rotor hub.

In practice, it is difficult to detect or determine the representative chord direction, since the view is blocked inside the rotor blade by blade spars, so that unhindered sight contact between the front edge and the rear edge of the blade cross section is prevented. In addition, the representative chord direction is not visible starting from the rotor hub, if looking from the inside of the rotor hub into the rotor blade or when the rotor blade is viewed from the outside. Accordingly, a blade marker is secured on the rotor blade in proximity to the blade, allowing the rotor blade to be mounted with the correct rotational orientation relative to the rotor hub, in that the blade marking is placed in a predetermined position relative to a hub marking, provided on the rotor hub (see, for example, WO 2010/017820 A2). A pitch angle rotary encoder is then used to measure subsequent rotations of the rotor blade in relation to the rotor hub.

When the wind turbine is in operation, various type of pitch angle occur. In each selected spaced position the true pitch angle is the angle between the local chord direction and the main rotational speed vector. Since the rotor blade is typically manufactured with a predetermined rotation along the longitudinal blade axis, the true pitch angle is not a single value, but rather a function (pitch angle function) of the spaced position. However, modern-day turbines use a single value for the pitch angle for each rotor blade in their control algorithms. To reduce the pitch angle function to a single value, a representative true pitch angle is defined for the rotor blade, by measuring the true pitch angle in the predetermined spaced position. In particular, the representative true pitch angle is defined as the angle between the representative chord direction and the main rotational speed vector. However, in the prior art the representative true pitch angle is not available meaning that in their control algorithms wind turbines currently use only the pitch angle at the blade root delivered by the pitch angle rotary encoder (blade root pitch angle) as the representative pitch angle. Here, the difference between the blade root pitch angle and the representative true pitch angle defines a pitch angle error.

A pitch angle error is both undesired and also potentially damaging to the wind turbine. A common pitch angle error occurs, if all rotor blades exhibit the same pitch angle error, leading to a reduction in the wind turbine's efficiency. It is more harmful, however, if the rotor blades have differing pitch angle errors, resulting in unbalanced blade loadings and consequently cyclical loading of the rotor shaft of the wind turbine, which can lead to fatigue failure.

In practice, a pitch angle error occurs either due to incorrect settings of the pitch angle rotary encoder in the factory or due to signal drift, damage or other faults in the correct operation of the pitch angle rotary encoder in practical use, including errors caused during maintenance of the wind turbine. Additional pitch angle errors, which do not occur at the blade root, however, occur due to torsion of the rotor blade along its longitudinal extension, wherein the torsion of the rotor blade can be both the result of torsional moments caused by wind forces and the result of a structural coupling between a deformation of the rotor blade in the longitudinal direction of the blade (e.g. deformation or the blade surfaces and/or the blade edges) and torsional deformation.

Thus, there is a desire to create the possibility of being able to measure the pitch angle error during practical use of a wind turbine, in particular continuously, without interruption and automatically. However, according to the current state of the art, an expensive and slow method of estimating the pitch angle error in practical use is employed. This method is associated with deploying people to the site of the wind turbine and also shutting down the wind turbine for a long period.

Furthermore, there is a desire to create the possibility of, in particular, continuous measurement of the true pitch angle of a rotor blade during wind turbine operation, without the need for a stoppage of the wind turbine or manual intervention. It should also be possible to detect asymmetries in the pitch angle at an early stage of their occurrence before significant, harmful, cyclical loads occur.

In addition, there is a desire to be able to carry out multiple measurements of the true pitch angle along the longitudinal extension of the rotor blade, in order to understand the torsion deformation and determine a more accurate pitch angle, which is representative of the aerodynamic state along the entire rotor blade.

Thus, a first objective is in particular to create the possibility of being able to accurately describe the chord line of a blade cross section in a predetermined spaced position, with consistency across all rotor blades of the same type.

A second objective is in particular to be able to measure the true pitch angle between the chord line at a preselected spaced position and the main rotational speed vector, without having to use a pitch angle rotary encoder on the rotor hub, so that the measurement of the true pitch angle is free from error cause by the pitch angle rotary encoder.

A third objective is in particular to be able to measure the true pitch angle substantially simultaneously at various spaced positions.

A fourth objective is in particular to be able to signal the true pitch angle in a predetermined spaced position to a control system of the wind turbine, allowing more precise wind turbine control algorithms.

The object of the invention be able to determine a pitch angle of the rotor blade more accurately.

According to the invention, this object is achieved by a method according to Claim 1. Preferred further developments are indicated in the subclaims and in the following description.

The abovementioned method for pitch angle measurement and/or for constructing a pitch angle measurement system on a rotor blade of a wind turbine, the rotor blade comprising blade root and extending along a longitudinal blade axis, the rotor blade being rotatably mounted, by its blade root, to rotate about the longitudinal blade axis, on a rotor hub of the wind turbine, the rotor hub rotating or being rotatable about a rotor axis, wherein at least one chord direction indicator is firmly connected to the rotor blade at a distance from the blade root and defines a chord direction indicator direction indicative of a direction of a chord of the rotor blade at the location of the chord direction indicator, by means of a or at least one torsion angle detection unit a torsion angle of the rotor blade is detected, by which the chord direction indicator direction is rotated relative to a chord direction indicator reference direction, by means of a or at least one blade root angle detection unit a blade root angle is detected, by which the blade root is rotated relative to a blade root reference position about the longitudinal blade axis, and by means of an evaluation unit on the basis of the torsion angle and the blade root angle a pitch angle of the rotor blade at the location of the chord direction indicator is determined, wherein the rotor blade or at least one rotor blade portion of the rotor blade firmly connected to the chord direction indicator is produced in a or at least one mould before being connected to the chord direction indicator, is further developed according to the invention in that while the, in particular produced, rotor blade or rotor blade portion, is preferably still enclosed in the mould, the chord direction indicator is firmly connected in a position, preferably defined relative to the mould, to the rotor blade or rotor blade portion, which in particular is defined relative to the mould.

In the mould the rotor blade or rotor blade portion is in a defined state which is also reproducible for each other rotor blade or rotor blade portion produced in the mould. Furthermore, this state forms a load-free state of the rotor blade or rotor blade portion, which in practical terms can no longer be achieved if the rotor blade or rotor blade portion is removed from the mould, since the rotor blade or rotor blade portion as a rule experiences a deformation outside the mould simply due to its own weight. Thus the mould forms a reference system in which the rotor blade or rotor blade portion already produced but still enclosed in the mould exists in its design configuration. Since the rotor blade or rotor blade portion, once it has been removed from the mould, in the region of the blade root also experiences practically no, or only little or negligible deformation, even in practical use, via the blade root of the rotor blade an unequivocal link can be created between the rotor blade and the mould.

Because the position in which the chord direction indicator is firmly connected to the rotor blade or rotor blade portion enclosed in the mould is defined relative to the mould, in particular the chord direction indicator reference direction is also defined and/or determined. This definition and/or determination of the chord direction indicator reference direction thus takes place in particular in the load-free state of the rotor blade, so that the torsion angle is detectable with greater accuracy than with conventional solutions. But the pitch angle can thus be determined with greater accuracy as well. A pitch angle error can therefore be avoided or at least substantially reduced.

In particular, the rotation of the rotor hub about the rotor axis defines a main rotational speed vector and/or the rotation of the rotor hub about the rotor axis is in particular defined and/or characterised by the or a main rotational speed vector.

Following production, the rotor blade or rotor blade portion is preferably removed from the mould and/or separated from this. Advantageously, the chord direction indicator is firmly connected to the rotor blade or rotor blade portion, before the, in particular produced, rotor blade or rotor blade portion is removed from the mould and/or separated from this.

According to a further development the rotor blade or rotor blade portion is produced from a rotor blade material, comprising a curable material. The chord direction indicator is preferably firmly connected to the rotor blade or the rotor blade portion following hardening of the curable material. The curable material is in particular a plastic and/or synthetic resin, such as for example epoxy. The chord direction indicator reference direction is preferably defined and/or determined and/or calculated following hardening of the curable material.

Preferably a or at least one chord direction indicator holder is provided, by means of which the chord direction indicator is held. By way of example, the chord direction indicator comprises the or at least one chord direction indicator holder. Advantageous, the chord direction indicator holder is firmly connected to the rotor blade or rotor blade portion, preferably in the or a position defined preferably relative to the mould, which in particular is defined relative to the mould, while the, in particular produced, rotor blade or rotor blade portion is preferably still enclosed in the mould. Advantageous following connection of the chord direction indicator holder to the rotor blade or rotor blade portion the chord direction indicator is secured to the chord direction indicator, preferably while the, in particular produced, rotor blade or rotor blade portion, is preferably still enclosed in the mould.

According to a configuration, the position of the chord direction indicator relative to the mould is defined by means of a or at least one tool aligned relative to the mould. Thus, the position in which the chord direction indicator is firmly connected to the rotor blade or rotor blade portion relative to the mould, can be determined with greater accuracy, which also leads to greater accuracy of the pitch angle. Thus the pitch angle in particular can be achieved. and/or calculated with an accuracy of 0.1° or 0.2°.

Preferably the mould is provided with a plurality of mould markings, at which the tool is positioned and/or by means of which the tool is aligned relative to the mould. This makes alignment of the tool relative to the mould easier and a simple possibility is created for achieving reproducibility of the alignment.

According to a first variant, the tool is a mounting tool, wherein the mould markings comprise mounting markings, at which the mounting tool is positioned and/or by means of which the mounting tool is aligned relative to the mould. Preferably, the chord direction indicator or the at least one chord direction indicator holder for holding the chord direction indicator relative to the mould is positioned by means of the mounting tool, whereupon in particular the chord direction indicator or chord direction indicator holder is firmly connected to the rotor blade or rotor blade portion.

According to a second variant, the tool is a measuring tool, wherein the mould markings comprise measuring markings, at which the measuring tool is positioned and/or by means of which the measuring tool is aligned relative to the mould. Preferably, the position of in particular the chord direction indicator relative to the mould, in particular already firmly connected to the rotor blade or rotor blade portion is, preferably optically, detected and/or determined and thus in particular defined.

It is preferred if the mould is provided with the or the plurality of mounting marking(s), at which the or one or at least one mounting tool is positioned and/or by means of which the or the at least one mounting tool is aligned relative to the mould. In particular, by means of the mounting tool the chord direction indicator or the or at least one chord direction indicator holder for holding the chord direction indicator is positioned relative to the mould, whereupon in particular the chord direction indicator or chord direction indicator holder is firmly connected to the rotor blade or rotor blade portion.

Advantageously, the mould is provided with the or a plurality of measuring markings, at which the or at least one measuring tool is positioned and/or by means of which the or a or at least one measuring tool is aligned relative to the mould. Preferably, by means of the measuring tool, the position of the chord direction indicator, in particular already firmly connected to the rotor blade or rotor blade portion, relative to the mould, is preferably detected and/or determined and thus in particular defined, preferably optically.

The measuring tool preferably comprises a or at least one optical reference sensor, by means of which the position of the chord direction indicator, in particular already firmly connected to the rotor blade or rotor blade portion, relative to the mould is optically detected and/or determined. The reference sensor is or comprises, for example, a camera, in particular a digital camera.

The measuring tool can also be used to calibrate a chord direction indicator which, for example, is positioned and/or mounted with the help of the mounting tool. According to a further development, by means of the measuring tool the position of the, in particular chord direction indicator already firmly connected to the rotor blade or rotor blade portion, relative to the mould is detected and/or determined and preferably the chord direction indicator is thus calibrated. Preferably the calibration a chord direction indicator formed which defines the position of the chord direction indicator, particular in relation to the mould and/or the blade root.

Preferably, the mould markings and/or the mounting markings and/or the measuring marking comprise engagement elements, which, preferably are or can be brought into engagement, for alignment of the tool and/or the mounting tool and/or the measuring tool, with the counter-engagement elements on the tool and/or the mounting tool and/or the measuring tool, in particular positively. The engagement elements involved are, for example, pins or holes. Furthermore, the counter-engagement elements involved are, for example, holes pins. Here, advantageously in each case a pin of the engagement element or counter engagement can be brought into engagement with a hole of the counter-engagement element or engagement element.

According to a configuration, the chord direction indicator reference direction is defined and/or determined and/or calculated, while the rotor blade or rotor blade portion is enclosed in the mould. The chord direction indicator reference direction is preferably defined and/or determined and/or calculated relative to the mould. Thus, in particular, a clear positional relationship is created between the chord direction indicator reference direction and the blade root. In particular, the chord direction indicator reference direction is indicative of the chord direction indicator direction in an untwisted state of the rotor blade. Preferably, the chord direction indicator reference direction corresponds to the chord direction indicator direction in the in state of the rotor blade or rotor blade portion. Advantageously, the chord direction indicator-reference direction corresponds to the chord direction indicator direction, when the chord direction indicator is firmly connected to the rotor blade or rotor blade portion enclosed in the mould.

The rotor blade is, for example, produced as a one-piece rotor blade and/or in the form of a monolithic unit. According to an alternative, the rotor blade is composed of two rotor blade half shells, of which one or at least one forms in particular the rotor blade portion.

According to a further development, the chord direction indicator provided with at least two chord direction indicator markings arranged next to each other in the chord direction indicator direction. Preferably, the torsion angle detection unit comprises a or at least one, in particular optical, sensor, by means of which the chord direction indicator markings are detected, in particular optically. The optical sensor is or comprises, for example, a camera, in particular a digital camera. Preferably, the chord direction indicator markings are configured as reflectors or in each case as a reflector. Preferably the torsion angle detection unit comprises a lighting unit, by means of which the chord direction indicator markings are or can be illuminated.

Preferably the or at least one chord direction indicator is associated with the torsion angle detection unit. In particular, the torsion angle detection unit comprises the or the at least one chord direction indicator.

According to a configuration the chord direction indicator and/or the torsion angle detection unit forms or comprises a or at least one measuring unit, which in particular is firmly connected to the chord direction indicator or forms this. The measuring unit is or comprises in particular an inertial measuring unit. Preferably, the measuring unit is or comprises one or at least one, in particular multi-axis, preferably three-axis acceleration sensor and/or gyroscopic sensor. In particular, these axes are linearly independent of one another and/or not coplanar. Preferably, these axes run perpendicularly to one another. By way of example, the measuring unit comprises a or at least one gyroscope. In particular, by means of the measuring unit, the torsion angle or a representative torsion angle is detectable, which is indicative of the torsion angle.

By way of example, the torsion angle detection unit is or becomes arranged at the location of the chord direction indicator and/or at the location of the chord direction indicator firmly connected to the rotor blade. However, preferably the torsion angle detection unit is or becomes firmly connected to the rotor blade in the area of the blade root. In this case, in particular the mechanical and/or electrical installation of the torsion angle detection unit is simplified.

According to a further development a blade root-fixed reference system is defined and preferably associated, in particular in a firmly connected manner, with the blade root. The blade root-fixed reference system involves in particular a blade root-fixed coordinates system. The blade root-fixed reference comprises two or three axes, which in particular are linearly independent of one another and/or not coplanar. Preferably the axes of the blade root-fixed reference system run perpendicularly to one another. The blade root-fixed reference system is in particular defined in the unstressed state of the rotor blade. By way of example, the blade root-fixed reference system is defined when the rotor blade or rotor blade portion is enclosed in the or the at least one mould. Preferably, the blade root-fixed reference system is defined relative to the or the at least one mould.

In particular the blade root reference position is or becomes defined in the or a blade root-fixed reference system. Furthermore, the chord direction indicator reference direction preferably is or becomes defined in the or a blade root-fixed reference system. Preferably the torsion angle is detected in the or a blade root-fixed reference system. Advantageously, the blade root angle is detected in the or a blade root-fixed reference system.

According to a configuration the blade root reference position and the chord direction indicator reference direction are or become defined relative to one another, preferably in or in relation to the or a blade root-fixed reference system. Thus, it is in particular possible, to establish a relationship between the torsion angle and the blade root angle, allowing the calculation and/or determination of the pitch angle.

According to a further development, the blade root angle detection unit is or becomes firmly connected to the rotor blade on or in the area of the blade root. Preferably the blade root angle detection unit is stationary relative to the torsion angle detection unit.

The blade root angle detection unit is or comprises preferably an inertial measuring unit. In particular, the blade root angle detection unit is or comprises a or at least one, in particular multi-axis, preferably three-axis, acceleration sensor and/or gyroscopic sensor.

By way of example, the blade root angle detection unit comprises a or at least one gyroscope. In particular, the blade root reference position is indicative of a non-rotated state of the blade root.

The measuring system for pitch angle measurement comprises preferably the chord direction indicator, the torsion angle detection unit, the blade root angle detection unit and the evaluation unit. Preferably the torsion angle detection unit and the blade root angle detection unit, are in particular linked electrically and/or optically and/or by radio, to the evaluation unit. Preferably, the torsion angle detection unit interacts with the chord direction indicator.

The evaluation unit is or comprises preferably a computing unit. The computing unit in particular involves an electronic computing unit. Advantageously, the evaluation unit and/or the calculation unit comprises a or at least one digital computer, by way of example a or at least on microprocessor and/or digital signal processor and/or microcontroller. Preferably the evaluation unit comprises a memory unit. The memory unit involves in particular an electronic memory unit. Advantageously, the evaluation unit and/or the memory unit comprises a Random Access Memory (RAM) and/or a Read Only Memory (ROM) and/or another electronic memory.

The invention also relates to a method for pitch angle measurement on a rotor blade of a wind turbine, the rotor blade comprising a blade root and extending along a longitudinal blade axis, the rotor blade being rotatably mounted by its blade root on a rotor hub of the wind turbine rotating or rotatable about a rotor axis, wherein a or at least one chord direction indicator is firmly connected at a distance from the blade root, and defines a chord direction indicator direction, indicative of a direction of a chord of the rotor blade at the location of the chord direction indicator, a torsion angle of the rotor blade is detected, through which the chord direction indicator direction is rotated relative to a chord direction indicator reference direction, a blade root angle is detected, through which the blade root is rotated relative to a blade root reference position about the longitudinal blade axis, and on the basis of the torsion angle and the blade root angle a pitch angle of the rotor blade is determined at the location of the chord direction indicator, wherein the rotor blade or at least a rotor blade portion of the rotor blade firmly connected to the chord direction indicator, in particular before being connected to the chord direction indicator, is produced in a or at least one mould, and wherein while the, in particular produced, rotor blade or rotor blade portion is, preferably still, enclosed in the mould, the chord direction indicator is firmly connected in a position, preferably defined relative to the mould, to the rotor blade or rotor blade portion, which in particular is defined relative to the mould.

This method can be further developed according to all the configurations described in connection with the previous method.

Figure 2:
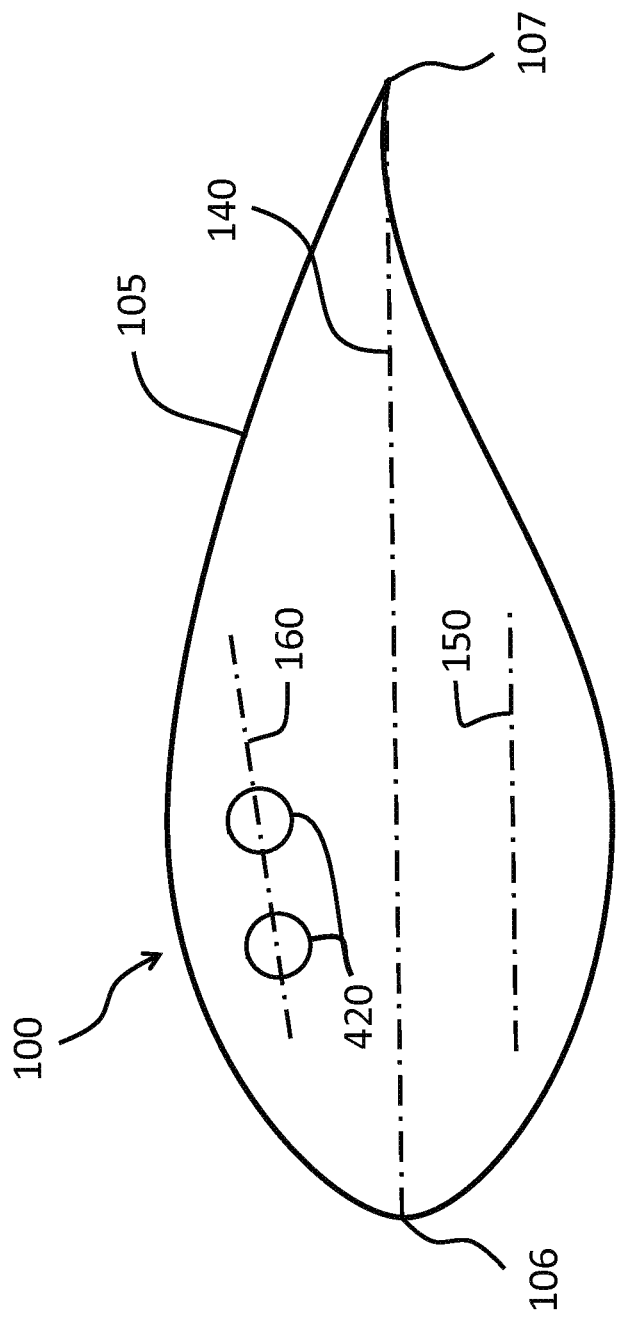
Figure 3:
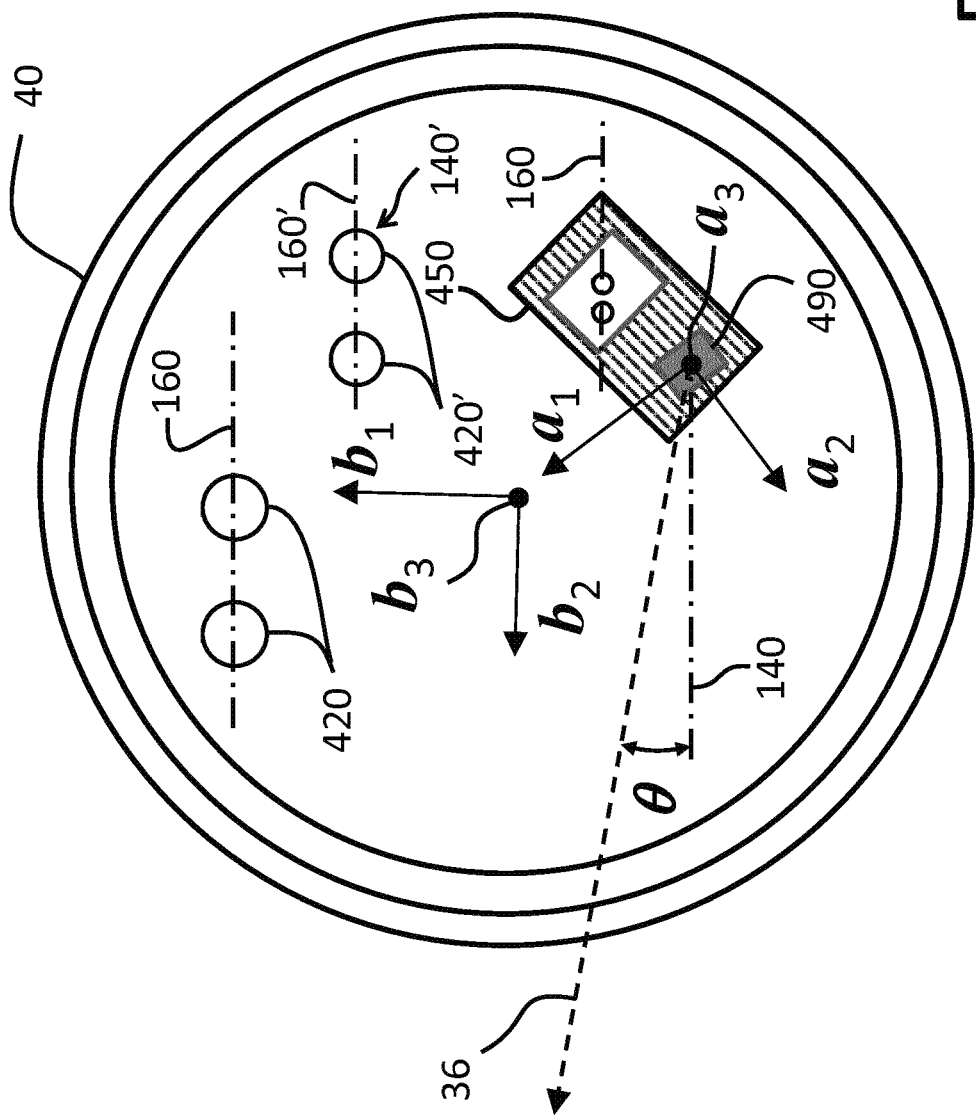
Figure 4:
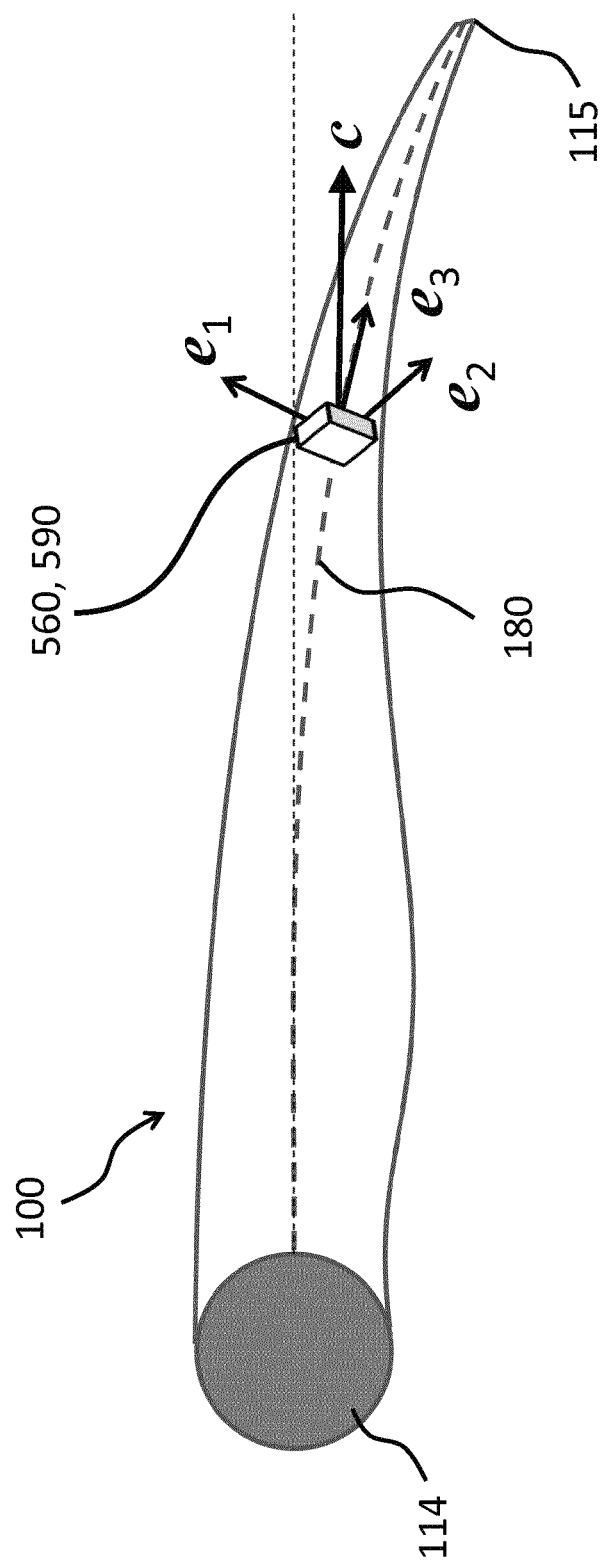
Figure 5:
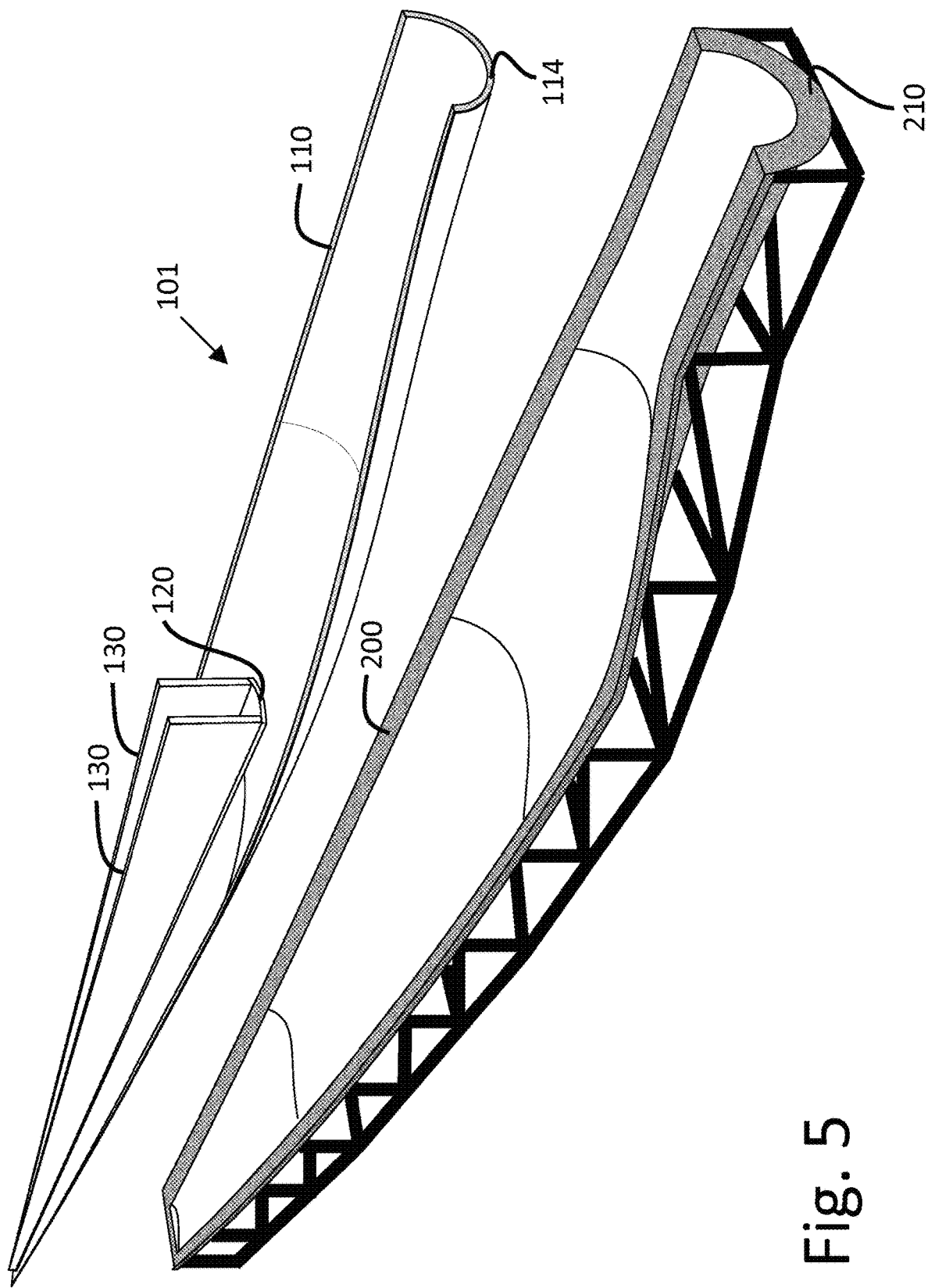
Figure 6:
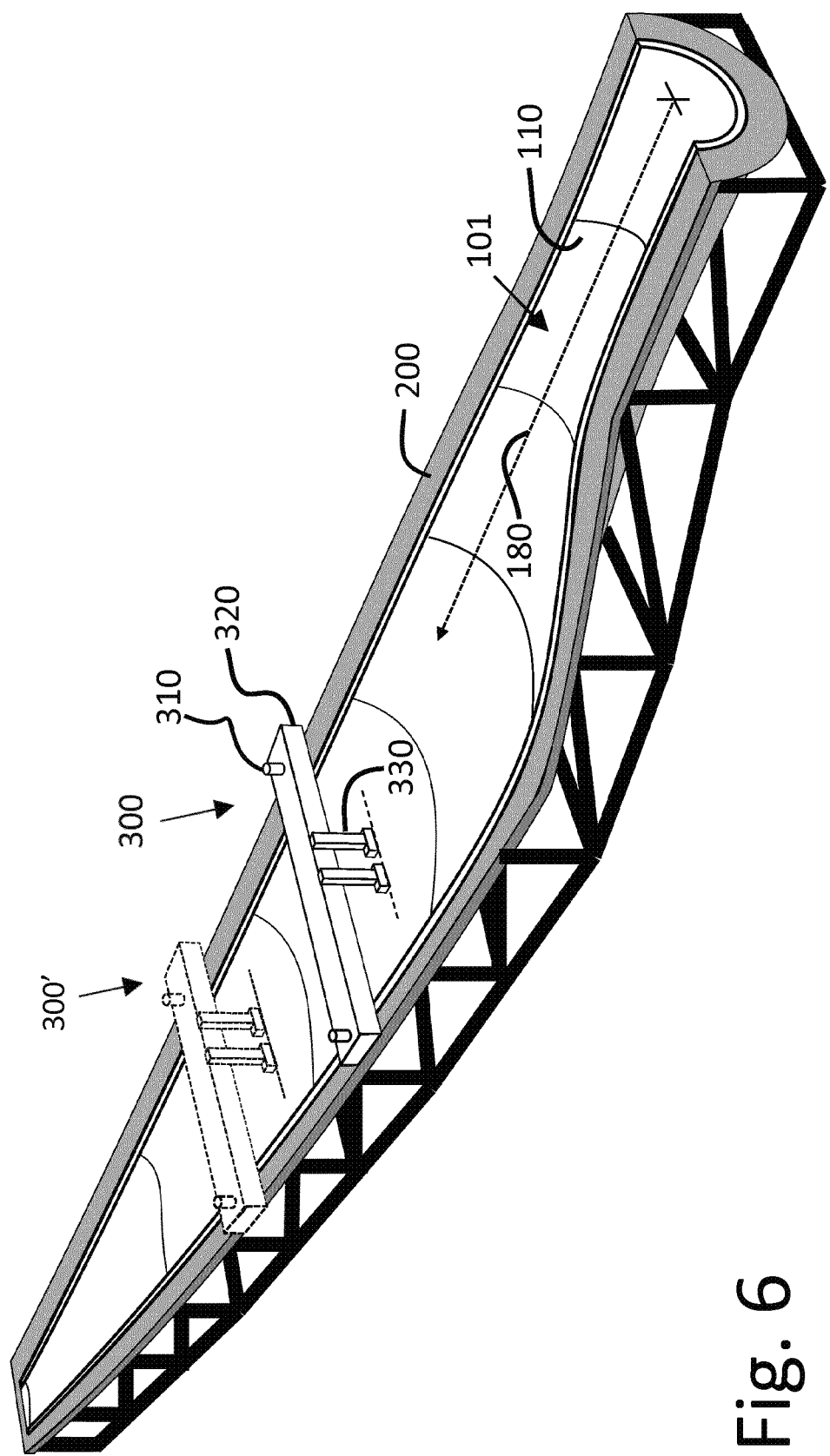
Figure 7:
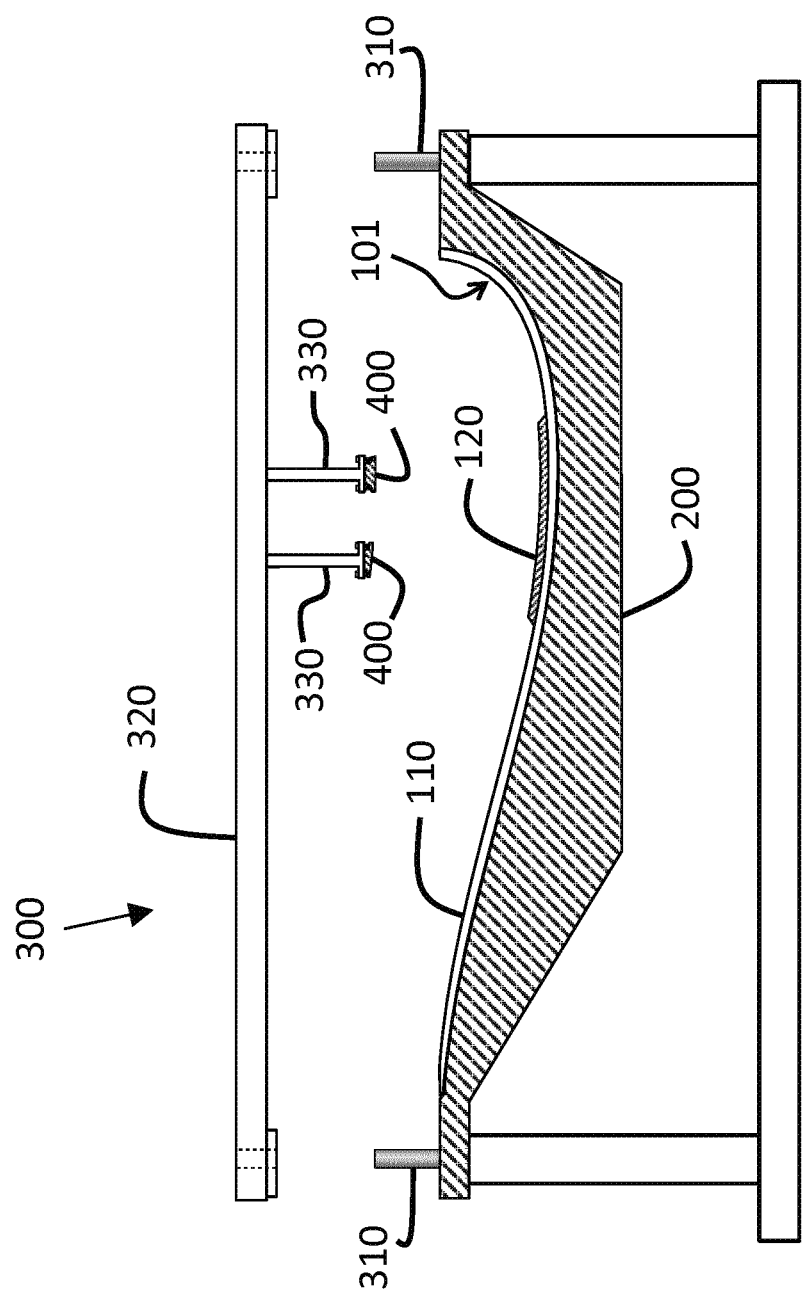
Figure 8:
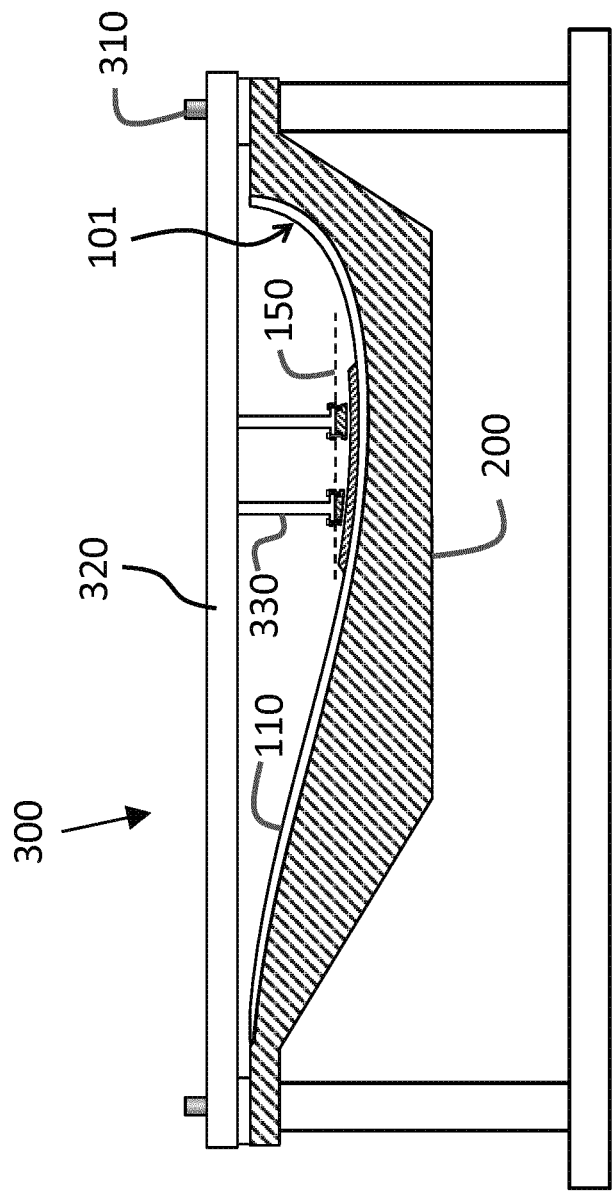
Figure 9:
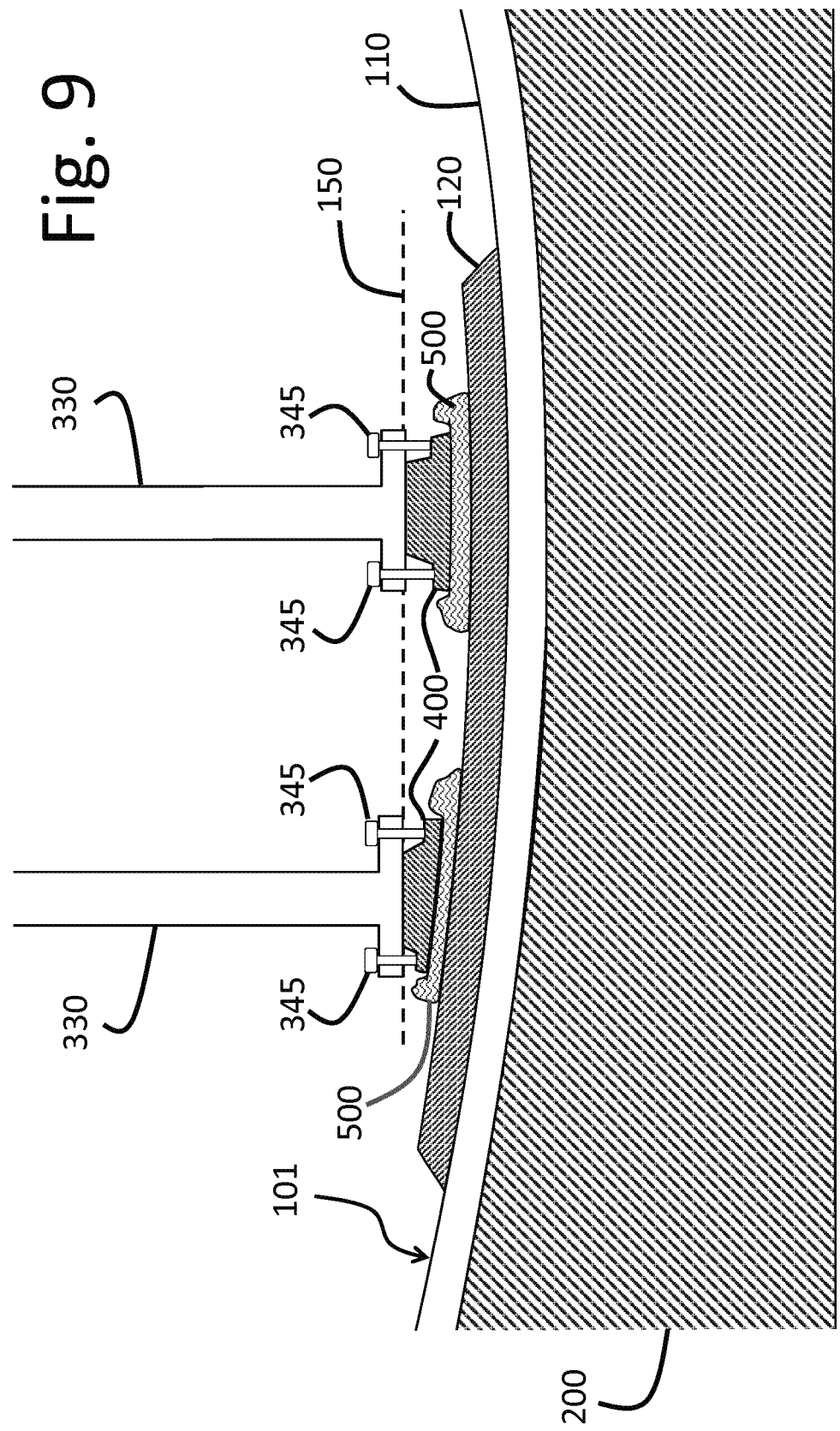
Figure 10:
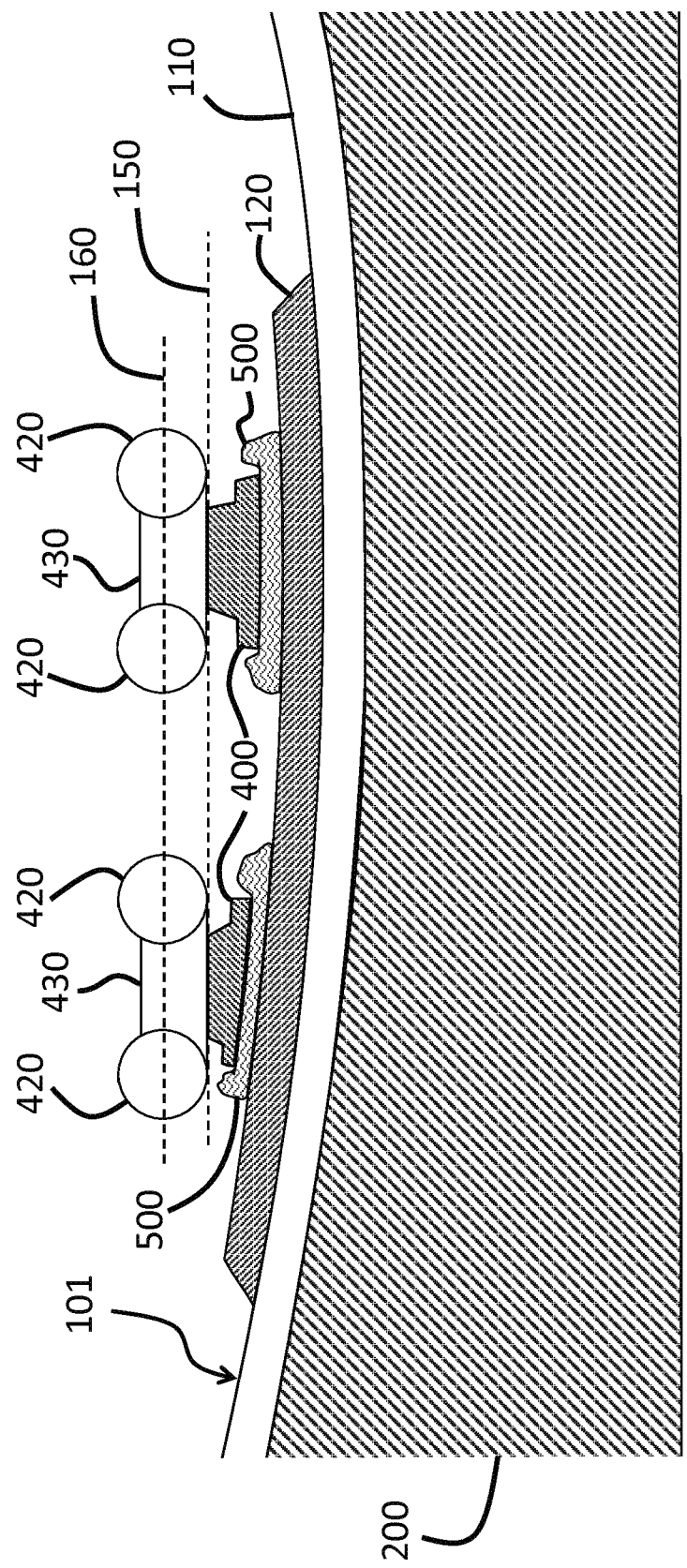
Figure 11:
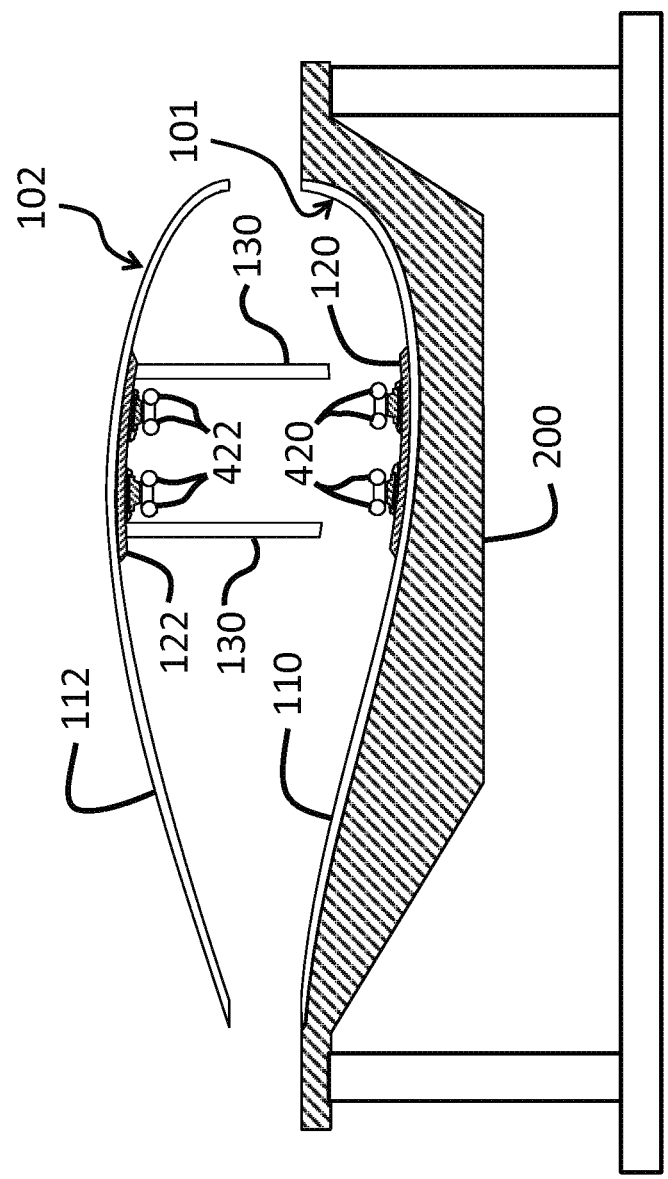
Figure 12:
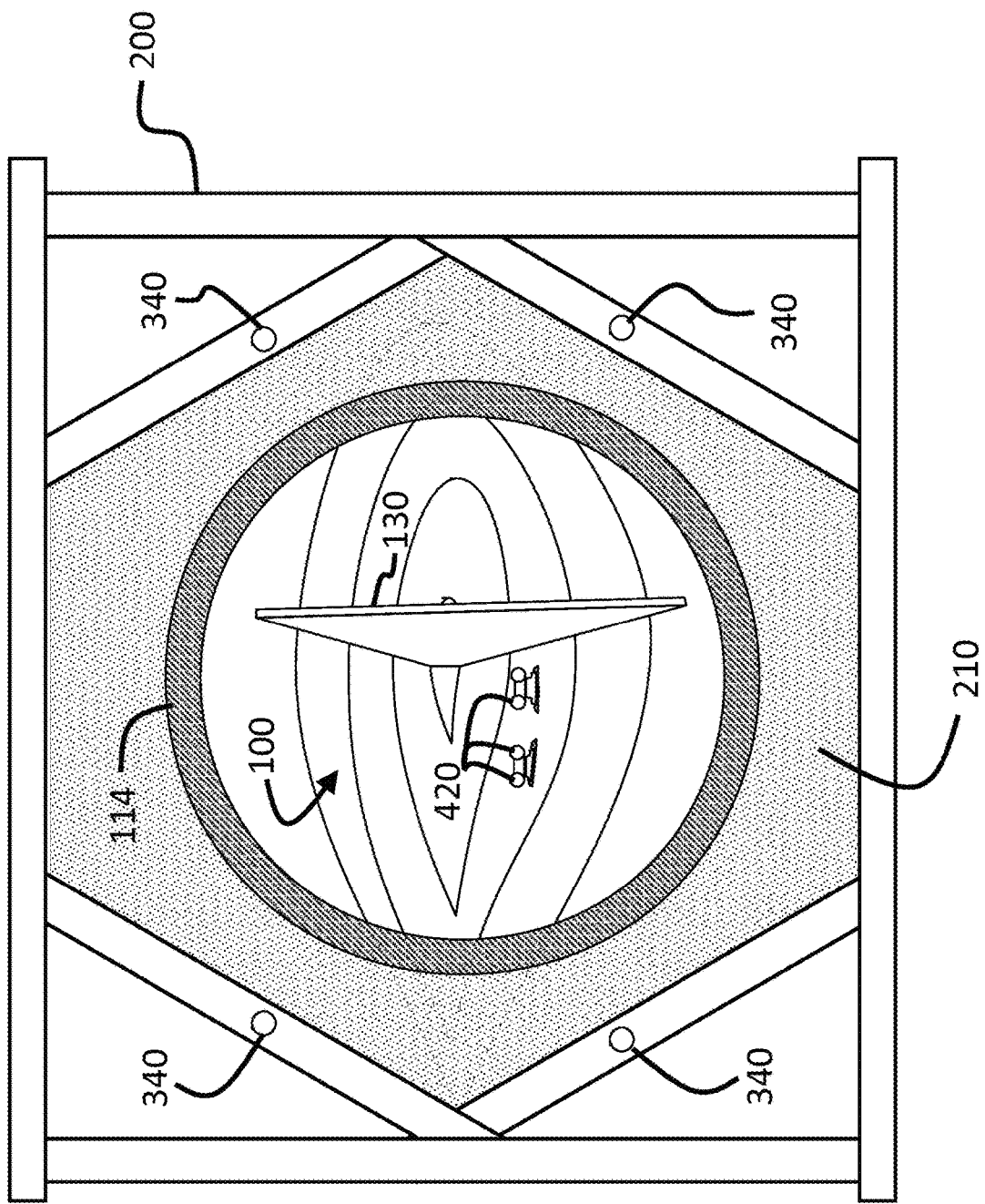
Figure 13:
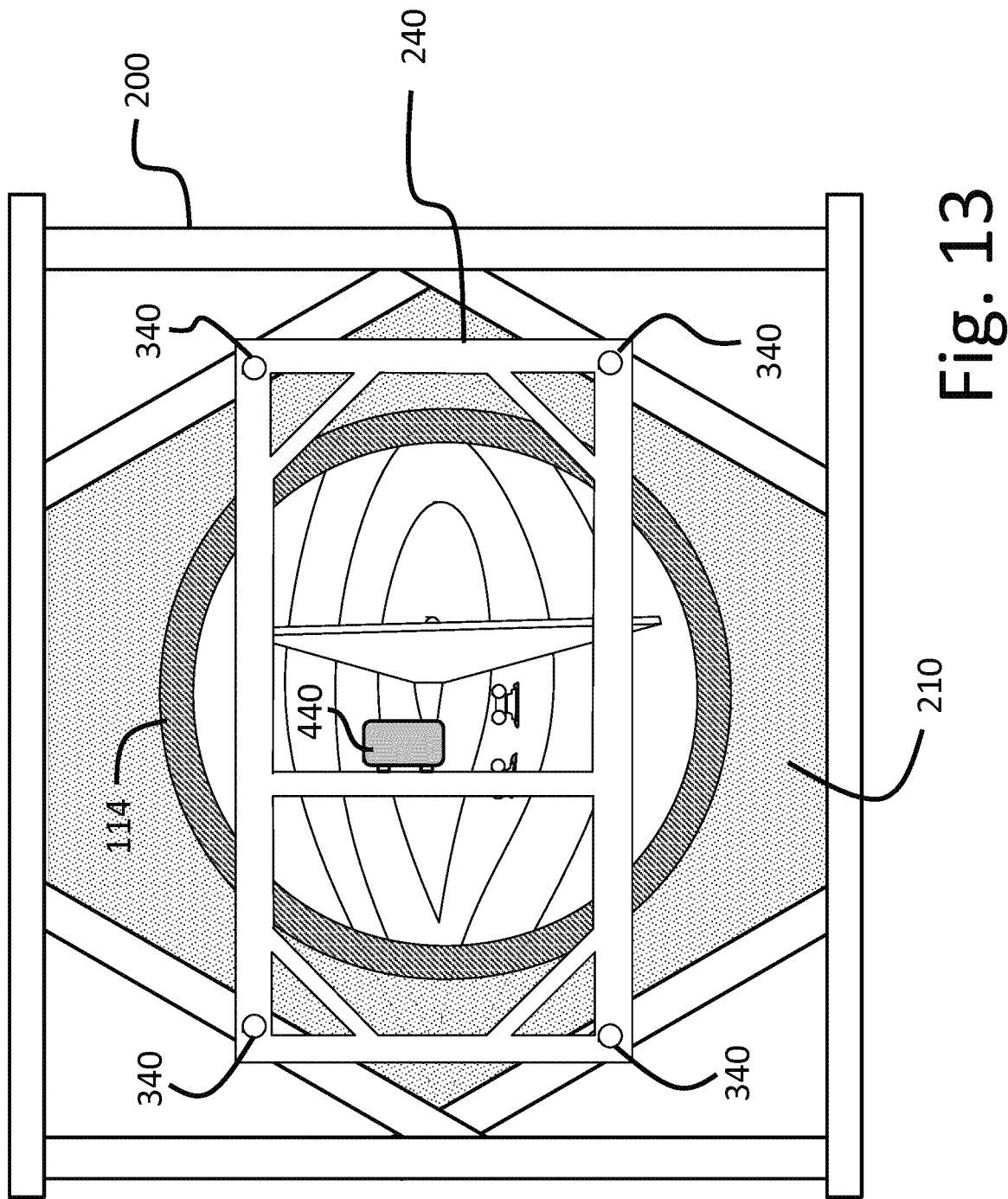

The invention is explained below on the basis of preferred embodiments by reference to the drawing. The drawing shows as follows:

FIG. 1 a perspective partial representation of a wind turbine;

FIG. 2 a schematic representation of a cross section of a rotor blade of the wind turbine;

FIG. 3 a schematic representation of an inside view of the rotor blade starting from its blade root;

FIG. 4 a schematic side view of a rotor blade according to a variant with an acceleration sensor;

FIG. 5 a schematic, perspective view of a rotor blade half shell of the rotor blade and a mould for producing the rotor blade half shell;

FIG. 6 a schematic, perspective view of the rotor blade half shell enclosed in the mould and a mechanical reference system according to a first embodiment;

FIG. 7 a schematic partial view of the mould and the rotor blade half shell, wherein a first mounting step for mounting reflectors is represented;

FIG. 8 a schematic side view of the mould and the rotor blade half shell, wherein a second mounting step for mounting the reflectors is represented;

FIG. 9 a schematic partial view of the mould and the rotor blade shell half, wherein a third mounting step for mounting the reflectors is represented;

FIG. 10 a schematic partial view of the mould and the rotor blade half shell, wherein a fourth mounting step for mounting the reflectors is represented;

FIG. 11 a schematic partial view of the mould and the rotor blade half shell, to which another rotor blade half shell is attached;

FIG. 12 a schematic frontal view of a rotor blade and a mould for producing the or a rotor blade according to an alternative production method and FIG. 13 a schematic frontal view of the rotor blade and the mould according to FIG. 12, wherein a support frame according to a second embodiment is mounted on the blade-root side frontal side of the mould.

FIG. 1 shows a perspective partial representation of a wind turbine, comprising a rotor shaft 30 mounted on a machine support 10 so that it can rotate about a rotor axis 35. A rotor hub 20 is torsionally rigidly connected to the rotor shaft 30, which rotates about the rotor axis 35 relative to the machine support 10 and drives an electric generator 50 secured to this. The rotation of the rotor shaft 30 and/or the rotor hub 20 defines a main rotational speed vector 36 (see FIG. 3) of the wind turbine and/or the rotation of the rotor shaft 30 and/or the rotor hub 20 is defined by the or a main rotational speed vector 36. The main rotational speed vector 36 thus characterises particular the rotation of the rotor shaft 30 and/or the rotor hub 20 about the rotor axis 35. A rotor blade 100 is associated with a longitudinal blade axis 180, along which the rotor blade 100 extends. The rotor blade 100 comprises a blade root 114 and is rotatably mounted with this by means of a blade bearing 40 on the rotor hub 20, to allow a rotation of the rotor blade 100 relative to the rotor hub 20 about the longitudinal axis 180 at the blade root 114. This rotation allows the angle of incidence of the rotor blade 100 to vary. The variation of the angle of incidence varies the lifting forces and flow resistances attacking or acting on the rotor blade 100 and thus the loads transmitted from the rotor blade 100 to the rotor hub 20. The rotor blade 100 comprises a front edge 106 and a rear edge 107 and is composed of an upper rotor blade half shell 102 and a lower rotor blade half shell 101, wherein the rotor blade half shells 101 and 102 are firmly connected to one another at the edges 106 and 107. A distance measured starting from the blade root 114 along the longitudinal blade axis 180 is in particular referred to as a spaced position. Preferably, a location or a position, having an, in particular, predetermined distance to the blade root 114 along the longitudinal blade axis 180, is referred to as a spaced position.

FIG. 2, shows a blade cross section (airfoil) 105 of the rotor blade 100, wherein the blade cross section 105 is associated with a chord, which is defined by an, in particular straight, line (chord line), which extends from the front edge 106 of the airfoil as far as the rear edge 107 of the airfoil. The chord comprises a chord direction, which is defined by an, in particular direct, or straight line, which connects the front edge 106 of the airfoil with the rear edge 107 of the airfoil and/or runs through the front edge 106 of the airfoil and the rear edge 107 of the airfoil. The chord direction characterises in particular the direction of the chord. Since the airfoil 105 of the rotor blade 100 varies along the longitudinal axis 180, the chord direction along the longitudinal blade axis 180 also varies. Thus, each blade cross section defines its own chord direction. A first chord direction 140 for the rotor blade 100 is defined as a chord direction at a first predetermined spaced position.

Part 1: Physical Measurement of the Pitch Angle

FIG. 3 shows a schematic representation of an inside view of the rotor blade 100 starting from its blade 114. A preselected blade coordinates system $\{b1, b2, b3\}$ is defined and dedicated to the blade root 114, so that the blade coordinates system $\{b1, b2, b3\}$ forms a blade root-fixed reference system. The blade coordinates system is or becomes clearly defined in relation to the geometric configuration of the rotor blade 100, when the rotor blade 100 is not exposed to any load. Preferably, without loss of generality, the b3-axis, starting from the blade root 114, is oriented along and/or in the direction of the longitudinal blade axis 180. Thus, the axes b1 and b2 in particular span a plane, in which either the blade root 114 lies or approximately lies or which is indicative of a plane, in which the blade root 114 lies or approximately lies. Preferably the origin of the blade coordinates system $\{b1, b2, b3\}$ lies on the longitudinal blade axis 180.

A measuring system for determining the or a pitch angle $\Theta$, which here in particular is a true pitch angle, comprises a main measuring unit 460, comprising a torsion angle detection unit 450 and a blade root angle detection unit 490 in the form of a gyroscope (see FIG. 1). The torsion angle detection unit 450 is a means for measuring the or an angular offset of at least the first chord direction 140 relative to the preselected blade coordinates system $\{b1, b2, b3\}$, fixed relative to the blade root 114.

The gyroscope 490 is arranged in proximity to the blade bearing 40 in the area of the blade root 114 of the rotor blade 100, so that the gyroscope 490 essentially experiences no movement or rotation relative to the blade bearing 40 and consequently to the preselected blade coordinates system $\{b1, b2, b3\}$, when the rotor blade 100 is under load.

The gyroscope 490 defines three vertical axes $\{a1, a2, a3\}$ (see FIG. 3) and measures the projections of the main rotational speed vectors 36 on these axes $\{a1, a2, a3\}$. Without loss of generality, starting from the blade root 114, the a3-axis is oriented along and/or in the direction of the longitudinal blade axis 180. Furthermore, the a1-axis and the a2-axis are oriented in an optional but predetermined and known direction. Since the axes $\{a1, a2, a3\}$ rotate together with the rotor blade 100, when the rotor blade 100 experiences a rotation about the longitudinal blade axis 180, but the main rotational speed vector 36 does not rotate together with this rotation, the abovementioned projections allow the gyroscope 490 to determine a gyro-pitch angle, which is indicative of the rotational angle of the rotor blade 100 about the longitudinal blade axis 180. A method for calculating the gyro-pitch angles of a rotor blade is, for example, disclosed in EP 2 896 827 A1, which is hereby incorporated by reference.

In a preferred configuration the torsion angle detection unit 450 comprises a camera 455 in particular configured as a digital camera, which is secured to the rotor blade structure and/or to the rotor blade 100 at or in proximity to the blade root 114. Preferably the camera 455 is mounted on an end plate 104 of the rotor blade 100. Furthermore, the torsion angle detection unit 450 and the gyroscope 490 are rigidly connected to one another, so that the relative alignment of the torsion angle detection unit 450 in relation to the gyroscope 490 is defined and/or constant and/or known. Particularly preferably, the gyroscope 490 is rigidly defined and/or integrated within a housing of the camera 455.

The camera 455 is in sight contact with at least two reflectors 420. The at least two reflectors 420 are rigidly secured to the rotor blade structure and/or to the rotor blade 100. Thus, the at least two reflectors 420 together with the rotor blade structure and/or the rotor blade 100 are exposed to a displacement and/or torsion at the location where the reflector is secured. In the preferred configuration, the camera 455 comprises lighting means, such as, by way of example, light-emitting diodes (LEDs), in order to light the reflectors 420. The reflectors 420 are positioned at the first predetermined spaced position, wherein this spaced position is selected such that the reflectors 420 remain in sight contact with the camera 455, when the rotor blade 100 experiences a deflection under load during the wind turbine operation. The first chord direction 140 is row defined as the chord direction of the rotor blade 100 in the spaced position of the at least two reflectors 420.

The at least two reflectors 420 define a reflector axis or reflector direction 160. In the preferred configuration, this axis 160 is defined by the mid-point of the reflectors 420, wherein however any other definition is also possible, provided that the definition clearly defines an axis in relation to the position of the reflectors 420. An angle σ is defined as an angle between the reflector axis 160 and the first chord direction 140, when the rotor blade 100 is unloaded. The angle σ is, in particular, calculated and/or detected only once for the rotor blade 100 and preferably stored in a calculation unit (evaluation unit) of the main measuring unit 460. The combination of the reflector axis 160 and the angle σ defines a first chord direction position indicator, in particular therefore, since these two variables, namely the reflector axis and the angle σ, can be combined, in order to define the alignment of the first chord direction 140 in the spaced position of the reflectors 420.

Since the at least two reflectors 420 are rigidly connected to the rotor blade structure and/or the rotor blade 100, the reflector axis 160 describes the local alignment of the rotor blade 100, when the rotor blade 100 experiences a bending and/or a torsion due to wind loads.

The image of the reflectors 420 on a light-sensitive element of the camera 455 defines the reflector axis 160 in relation to a camera body of the camera 455. The internal orientation between the light-sensitive element and the gyroscope axes {a1, a2, a3} is, in particular established and/or measured and stored once at the time of mounting of the torsion angle detection unit 450, preferably before the torsion angle detection unit 450 is secured to the rotor blade structure and/or the rotor blade 100. Using this stored and/or measured value of the internal orientation, the orientation of the reflector axis 160 is translated from the light-sensitive element to the gyroscope axes {a1, a2, a3} and the value transmitted to the calculation unit (evaluation unit) of the main measuring unit 460.

The calculation unit (evaluation unit which knows both the reflector axis 160 and also the main angular speed vector 36 in the coordinates system {a1, a2, a3}, calculates, in particular in the form of a signal, the angle between the angular speed vector 36 and the reflector axis 160. By adding the stored data on the orientation σ of the reflector direction 160 relative to the first chord direction 140 of the rotor blade 100, preferably instantaneously or substantially, instantaneously, a first pitch angle Θ of the rotor blade 100 calculated and/or determined, which in particular is a true pitch angle.

In a further configuration a second chord direction 140' for the rotor blade 100 is defined as the chord direction in a second predetermined spaced position. Reflectors 420' are rigidly secured to the rotor blade 100 at the second predetermined spaced position, wherein the reflectors 420' define a second reflector axis or reflector direction 160'. The method for determining the first pitch angle Θ of the rotor blade 100 is repeated for determining a second pitch angle of the rotor blade 100, which in particular is a true pitch angle. Here, time-varying differences between the first and the second pitch angle demonstrate the dynamic torsional movement of the rotor blade 100. A mean of the first and second pitch angle forms in particular an alternative representative pitch angle for the rotor blade 100. Both the dynamic torsional motion and the representative pitch angle are transmitted to a central control unit of the wind turbine, in order in particular to allow the use of extended control algorithms.

FIG. 4 shows a schematic side view of a rotor blade 100 according to a variant or second configuration, wherein the torsion angle detection unit 450 comprises a 3-axis accelerometer 560, which is positioned along the longitudinal extension of the rotor blade 100 at an optional point, at which in particular significant bendings of the rotor blade 100 occur in normal operation, such as by way of example in proximity to the rotor blade tip 115. Preferably the accelerometer 560 is positioned in the or a first spaced position or in another spaced position. Without loss of generality, the axes {e1, e2, e3} of the accelerometer 560 are oriented such that the e3-axis points and/or is oriented along and/or in the direction of the longitudinal axis 180 of the rotor blade 100, wherein the e1-axis and the e2-axis in particular span a cross-sectional plane in the spaced position of the accelerometer 560. In the presence of bendings of the rotor blade 100 during the wind turbine operation the centripetal acceleration vector c comprises a projection onto the cross-sectional plane of the rotor blade 100 spanning the axes {e1, e2}. Since the orientation of the centripetal acceleration vector c is known, namely perpendicular to the main rotational speed vector 36, and in particular also the gravitational acceleration vector in the instantaneous azimuth position of the rotor blade 100 is calculated from the wind turbine geometry, the total acceleration vector at the accelerometer 560 is known. Here, the azimuth position characterises in particular the rotary position of the rotor blade 100 in relation to the rotor axis 35, preferably in relation to a reference rotary position. Consequently, the torsion angle of the or at the location of the accelerometer 560, can in particular be determined by an arctangent calculation of the components of the acceleration vector c along the axes e1 and e2. Since the position and the orientation of the accelerometer 560 relative to the chord direction of the rotor blade 100 and relative to the preselected blade coordinates system {b1, b2, b3} at the blade root 114 are known, the instantaneous angle of the chord direction can be calculated in relation to the preselected blade coordinates system {b1, b2, b3} at the blade root 114. Thus, the torsion angle is in particular measured and/or detected and/or determined by a projection of the centripetal acceleration and/or of the centripetal acceleration vector c onto the axes {e1, e2, e3}. In this embodiment the combination of the accelerometer axes {e1, e2, e3} and the or an angle σ defines the or a first chord direction indicator, since the projections of the acceleration onto the acceleration axes {e1, e2, e3} and the angle σ can be combined, in order to define the orientation of the first chord direction in the spaced position of the reflectors and/or the accelerometer. According to a variation, instead of the accelerometer 560 a gyroscope 590 is used. Preferably in this case, preferably by means of the gyroscope 590, a projection of the or a rotational angle speed vector, which in particular is defined by the rotation of the rotor blade 100 about the rotor axis 35, is measured and/or detected on the axes {e1, e2, e3}. Advantageous, the torsion angle is detected and/or determined by the projection of the rotational angle speed vector onto the axes {e1, e2, e3}. Use of the gyroscope 590 instead of the accelerometer 560 is in particular associated with the advantage that gravity has no role to play, so that the determination of the torsion angle does not have to take account of the gravitational acceleration vector in the instantaneous azimuth position of the rotor blade 100.

This direct measurement the physical pitch angle of the rotor blade 100 is independent of a pitch angle rotary encoder and thus also free of its measurement errors.

Furthermore, the pitch angle is preferably measured automatically, that is to say without manual intervention, continuously over time during wind turbine operation. As a further advantage in particular the physical pitch angle of all rotor blades of the wind turbine i preferably continuously, compared and the amount of any physical pitch angle asymmetry between the rotor blades is determined. If this value or amount exceeds a predetermined threshold value, in particular an alarm is generated by the measuring system and reported to the central control unit of the wind turbine, to a wind turbine SCADA unit or to another unit desired by the operator or manufacturer of the wind turbine. The threshold value can be set sufficiently low to detect a pitch angle asymmetry in its early development stage, in particular before significant, damaging, cyclical loads occur.

Part 2: Clear Identification of the Chord Line of the Rotor Blade

The chord line of the rotor blade is in particular determined consistently and individually for each rotor blade of the wind turbine. Due to the smooth, curved surface of the rotor blade 100 it is difficult in practical use to mark the chord line with the necessary accuracy. In practice an accuracy of 0.5 degrees, preferably of 0.1 degrees, is desired. Furthermore, the material of the rotor blade 100 comprises residual stresses arising from the production process, which can alter the form of the rotor blade 100 in a certain way, preventing or impeding definition of a clear and/or constant and/or the same chord line for all rotor blades. For example, the rotor blade material typically comprises a large proportion of epoxy or similar resin. However, the curing of epoxy and/or the similar resin is an exothermic process, which often generates strong temperature gradients in the material during the rotor blade production and therefore due to the gradients in the thermal expansion of the material causes stresses, which are frozen into each rotor blade.

A clear chord line is defined according to a first embodiment, which is in particular explained with reference to FIGS. 5 to 11, is defined by the use of a mechanical reference system 300, which makes use of the geometry of a mould 200, in which the rotor blade 100 or a rotor blade portion of the rotor blade 100 is produced. The geometry of the mould 200 is a clear and equal and/or constant, size, which is invariant across all rotor blades produced by means of the mould 200. The mechanical reference system 300 creates a relationship between the rotor blade 100 and the mould 200 in a clear and reproducible manner, such that this relationship is produced when the rotor blade 100 is still enclosed in the mould 200, and in fact once the curing is complete and before the rotor blade 100 is separated from the mould. In particular, at this point in the production process, the rotor blade 100 adopts a configuration which, preferably by definition, is the or a flee configuration of the rotor blade 100 and/or identifies the or a load-free state of the rotor blade.

According to the first embodiment, the rotor blade 100 is produced from the or a lower half shell 101 and the or an upper half shell 102, wherein the half shells 101 and 102 are initially produced, in particular separately, and then joined together. Preferably in addition one or more blade spars 130 are provided and/or mounted for joining the two half shells 101 and 102 together. The half shells 101 and 102 preferably represent the suction side and pressure side of the rotor blade 100. In the rotor blade half shells 101 and 102 are in particular formed by notional cutting of the complete rotor blade 100 substantially along the chord of the rotor blade cross section 105, so that the connection between the upper and lower half shells 101, 102 takes place at the front edge 106 and at the rear edge 107 of the rotor blade 100.

By reference to FIG. 5 the or a mould 200 and the or a lower half shell 101 of the rotor blade 100 are shown, wherein for illustration purposes the lower half shell 101 is represented offset from the mould 200. The lower half shell 101 comprises a half shell skin 110 and a spar flange 120. The spar flange 120 comprises in particular strong, substantially unidirectional fibres, which provide the rotor blade 100 as a whole with resistance to bending of the rotor blade 100.

According to FIG. 6 the mould 200 comprises alignment pins 310 for accommodating and aligning a bridge component 320 of the mechanical reference system 300. The mechanical reference system 300 forms in particular a mounting tool. Furthermore, the alignment pins 310 are in particular referred to as mounting markings. Once the half shell skin 110 and the spar flange 120 have been produced in the mould 200 and hardened, but before the lower half shell 101 is removed from the mould 200, the mechanical reference system 300 is secured to the mould 200 using the alignment pins 300.

The mechanical reference system 300 comprises at least one arm 330, which extends in the direction of the lower half shell 101 and releasably holds a reflector foot 400, as indicated by FIG. 7. When the mechanical reference system 300 fully interlocks with the alignment pins 310, so that it is located in its desired position in relation to the mould 200, the reflector foot 400 is arranged at a specified, predetermined position in relation to the lower half shell 101, as indicated by FIG. 8. According to the first embodiment, the mechanical reference system 300 locates the reflector foot 400 in the specified, predetermined position, in particular via the spar flange 120. The spar flange 120, which consists of a stronger material composition than the half shell skin 110, experiences a lower deformation in the cross-sectional plane, when the rotor blade 100 is under load during operation. Consequently the torsional movement of spar flange 120 is more indicative of the mean torsional movement of the rotor blade cross section than, for example, the half shell skin 110, when the rotor blade 100 is under load.

According to the first embodiment in the specified, predetermined position of the reflector foot 400 via the spar flange 120 in particular a space or gap between the reflector foot 400 and the surface of the spar flange 120 is provided. This space or gap is filled with an adhesive 500, by way of example with epoxy or a similar resin, as indicated by FIG. 9. According to the first embodiment the reflector foot 400 defines a reference surface 150, which is clear and firm and and/or rigid in relation to the local chord line of the rotor blade cross section at the location of the reflector foot 400. The reference surface 150 is either parallel to the local chord or rotationally offset from the local chord line by a predetermined amount. The local chord line is selected as the first chord line direction.

Once the adhesive 500 has hardened, the at least one arm 330, which here in particular is connected by releasable securing means 345 in the form of screws with the reflector foot 400, is released from the reflector foot 400 and removed and a reflector body 430, comprising one or more reflectors 420, is secured to the reflector foot 400, as indicated by FIG. 10. A total of at least two reflectors 420 are mounted on the rotor blade half shell 101, so that midpoints of the reflectors 420 separated by a predetermined distance from one another define a reflector direction 160. According to the first embodiment in particular two reflector feet 400 are used, each of which preferably holds two reflectors 420, so that a reflector pattern of four or more substantially linearly aligned reflectors 420 is created, wherein the reflector pattern directly or indirectly, e.g. in the sense of the least squares, defines the reflector direction 160.

Preferably the reflectors 420 and/or the reflector foot or feet 400 and/or the reflector body 430, preferably together, forms or form a chord direction indicator, which in particular is or becomes firmly connected to the rotor blade 100. Furthermore, the reflector direction 160 and/or the reflector axis 160 in particular forms a chord direction indicator direction.

The reflectors 420 are preferably mounted on the reflector body 430, before any activity relating to the rotor blade assembly is undertaken and, in particular, optically calibrated. The calibration preferably comprises the optical measurement of the reflector direction 160 and preferably the measurement of the angle between the reflector direction 160 and the reference surface and/or a surface of the reflector body 430, which meets the reflector foot 400, which in particular corresponds to the reference surface 150. Once the reflector body 430 has been secured to the reflector foot 400, the angle between the reflector direction 160 and the reference surface 150 is known.

When the second chord direction has to be defined for the rotor blade 100, a second mechanical reference system 300' is used at the second predetermined spaced position, as indicated in FIG. 6. The same method used for mounting the reflector feet 400 at the first predetermined spaced position, is repeated, to mount the reflector feet at the second predetermined spaced position.

The upper half shell 102 is produced by a similar method in a second rotor blade half mould and/or mould. In this method, an additional group of reflectors 422 is preferably secured to an upper spar flange 122. If the upper and lower half shells are brought into interconnection, as indicated by FIG. 11, the reflector pattern as a whole comprises a plurality of reflectors, which correspond to the chord direction in particular. This correspondence is advantageous, since it allows the chord direction of the rotor blade to be expressed in a more robust manner, for example as a mean of the upper and lower reflector pattern direction.

According to the variant, in which the torsion angle detection unit 450 and/or the or a chord direction indicator comprises the accelerometer 560 arranged at a predetermined spaced position in the rotor blade 100, the securing of the accelerometer 560 to the inner surface of the rotor blade 100 follows the same steps mentioned above for the reflectors, with the difference that the housing of the accelerometer 560 replaces the reflector body 430. In particular, the securing of the housing of the accelerometer 560 to the reflector foot 400 orients the housing of the accelerometer 560 along the reference surface 150, as a result of which the accelerometer 560 is clearly aligned both in relation to the chord direction and also in relation to the blade root 114.

According to a second embodiment the entire rotor blade 100 is produced as a monolithic unit, wherein, for example, airbags or similar devices are used, which during the resin injection and curing form a core and/or occupy the empty interior of the rotor blade. The second embodiment is in particular explained by reference to FIGS. 12 and 13. According to the second embodiment the mechanical reference system 300 in particular may not be used. In order to provide the optical markings on the inner surface of the rotor blade 100 at selected spaced positions, following curing of the rotor blade 100 at least one reflector body with at least two reflectors 420 is secured to the inner surface of the rotor blade 100, before the rotor blade 100 is removed from the mould 200. The sticking of the reflector body 430 is in particular carried out without close reference to the mould 200, which is not visible from the inside of the rotor blade 100. Thus, the angle difference between the reflector direction 160 and the chord direction of the rotor blade 100 is unknown. To quantify this angle difference, at a blade root position 210 of the mould 200, in particular the blade root position 210 associated with the blade root, reference pins 340 are secured to the mould 200 and/or provided. The reference pins 340 are used to accommodate a support frame 240 and position the support frame 240 clearly and reproducibly in relation to the mould 200. A reference camera 440 is secured at a predetermined point and with a predetermined orientation to the support frame 240, so that the reference camera 440 has a known, predetermined orientation in relation to the chord direction of the rotor blade 100. The reference camera 440 is also in sight contact with the at least one reflector body 430 and can therefore measure the reflector direction 160. Here, the position of the reference camera 440 in relation to the blade root 114 does not have to be the same as the position of the camera 455 used during the wind turbine operation.

In particular, the support frame 240, preferably together with the reference camera 440, forms a measuring tool. Furthermore, the reference pins 340 are in particular referred to as measuring markings.

Through the combination of the measured reflector direction 160 and the predefined orientation of the reference camera 440 in relation to the chord direction of the rotor blade 100, the angular alignment of the reflector direction 160 in relation to the chord direction of the rotor blade 100 is calculated and/or detected and stored for use during wind turbine operation.

LIST OF REFERENCE SIGNS

10 Machine support
20 Rotor hub
30 Rotor shaft
35 Rotor axis
36 Man rotational speed vector
40 Blade bearing
50 Electric generator
100 Rotor blade
101 Lower blade half of the rotor blade
102 Upper blade half of the rotor blade
104 End plate of the rotor blade
105 Blade cross section of the rotor blade
106 Front edge of the rotor blade
107 Rear edge of the rotor blade
110 Skin of the lower blade half
112 Skin of the upper blade half
114 Blade root of the rotor blade
115 Blade tip of the rotor blade
120 Spar flange of the lower blade half of the rotor blade
122 Upper spar flange
130 Blade spar of the rotor blade
140 (First) chord/chord direction of the rotor blade 140' Second chord/chord direction of the rotor blade
150 Reference surface
160 Chord line direction/reflector axis/reflector direction
180 longitudinal blade axis of the rotor blade
200 Mould
210 Blade root position of the mould
220 Support frame/measuring tool
300 Mechanical reference system/mounting tool
300' Second mechanical reference system
310 Alignment pins/mounting markings
320 Bridge components of the mechanical reference system
330 Arm of the mechanical reference system
340 Reference pins/measuring markings
345 Releasable securing means/screws
400 Reflector foot
420 Reflector
422 Additional group of reflectors
430 Reflector body
440 Reference camera
450 Torsion angle detection unit
455 Camera of the torsion angle detection unit
460 Main measuring unit
490 Blade root angle detection unit/gyroscope
500 Adhesive
560 Accelerometer
590 Gyroscope
Θ pitch angle
σ angle
c Acceleration vector
{b1, b2, b3} blade coordinates system on the blade root
{a1, a2, a3} Coordinates system of the gyroscope
{e1, e2, e3} Coordinates system of the accelerometer

The invention claimed is:

1. A method for at least one of pitch angle measurement and/or for constructing a pitch angle measurement system, the method comprising:
providing a rotor blade of a wind turbine, wherein the rotor blade having a blade root and extending along a longitudinal blade axis, the rotor blade being rotatably mounted, by the blade root, to rotate about the longitudinal blade axis, on a rotor hub of the wind turbine, the rotor hub rotating or being rotatable about a rotor axis, wherein at least one chord direction indicator is connected to the rotor blade at a distance from the blade root and defines the at least one chord direction indicator direction indicative of a direction of a chord of the rotor blade at the location of the at least one chord direction indicator, by means of at least one torsion angle detection unit a torsion angle of the rotor blade is detected, by which the at least one chord direction indicator direction is rotated relative to a chord direction indicator reference direction, by means of a blade root angle detection unit a blade root angle is detected, by which the blade root is rotated relative to a blade root reference position about the longitudinal blade axis, and by means of an evaluation unit on the basis of the torsion angle and the blade root angle a pitch angle (Θ) of the rotor blade at the location of the at least one chord direction indicator is determined, wherein the rotor blade or at least one rotor blade portion of the rotor blade connected to the at least one chord direction indicator is produced in a or at least one mould before being connected to the at least one chord direction indicator,
while the rotor blade or the at least one rotor blade portion is still enclosed in the mould or the at least one mould, connecting the at least one chord direction indicator in a position, defined relative to the mould or the at least one mould, to the rotor blade or the at least one rotor blade portion, which is defined relative to the mould or the at least one mould; and
wherein the torsion angle detection unit is connected to the rotor blade or the at least one rotor blade portion at the blade root or in the area of the blade root.

2. The method according to claim 1, wherein the position of the at least one chord direction indicator relative to the mould or the at least one mould is defined by means of a tool, which is aligned relative to the mould or the at least one mould.

3. The method according to claim 2, wherein the mould or the at least one mould is provided with a plurality of mould markings, by means of which the tool is aligned relative to the mould or the at least one mould.

4. The method according to claim 1, wherein the mould or the at least one mould is provided with a plurality of mounting markings, at which at least one mounting tool is positioned, by means of which the at least one chord direction indicator or at least a chord direction indicator holder for holding the at least one chord direction indicator relative to the mould or the at least one mould is positioned, whereupon the at least one chord direction indicator or the at least a chord direction indicator holder is connected to the rotor blade or the at least one rotor blade portion.

5. The method according to claim 1, wherein the mould or the at least one mould is provided with a plurality of measuring markings, at which a measuring tool is positioned, by means of which the position of the at least one chord direction indicator already connected to the rotor blade or the at least one rotor blade portion relative to the mould or the at least one mould is detected and thus defined.

6. The method according to of claim 1, wherein while the rotor blade or the at least one rotor blade portion is enclosed in the mould or the at least one mould, the chord direction indicator reference direction is defined.

7. The method according to claim 6, wherein the chord direction indicator reference direction is defined or determined relative to the mould or the at least one mould.

8. The method according to claim 1, wherein the rotor blade is comprised of two rotor blade half shells, one of which forms the at least one rotor blade portion.

9. The method according to claim 1, wherein the at least one chord direction indicator includes at least two chord direction indicator markings arranged next to each other along the at least one chord direction indicator direction, and the torsion angle detection unit comprises at least one optical sensor, by means of which the at least two chord direction indicator markings are optically detected.

10. The method according to claim 1, wherein the chord direction indicator reference direction is indicative of the at least one chord direction indicator direction in an untwisted state of the rotor blade or the at least one rotor blade portion.

11. The method according to claim 1, wherein at least one of the blade root reference position and the chord direction indicator reference direction are defined, or become defined, relative to one another.

12. The method according to claim 1, wherein the torsion angle and the blade root angle are detected in a blade root-fixed reference system (b1,b2, b3), which is defined in an unstressed state of the rotor blade or the at least one rotor blade portion.

13. The method according to claim 1, wherein at least one of the blade root reference position and the chord direction indicator reference direction are defined, or become defined, in a blade root-fixed reference system (b1, b2, b3).

14. The method according to claim 1, wherein the blade root angle detection unit is connected to the rotor blade or the at least one rotor blade portion at least at one of the blade root, or in the area of the blade root, and is stationary relative to the torsion angle detection unit.

15. A method for at least one of pitch angle measurement and/or for constructing a pitch angle measurement system, the method comprising:

providing a rotor blade of a wind turbine, wherein the rotor blade having a blade root and extending along a longitudinal blade axis, the rotor blade being rotatably mounted, by the blade root, to rotate about the longitudinal blade axis, on a rotor hub of the wind turbine, the rotor hub rotating or being rotatable about a rotor axis, wherein at least one chord direction indicator is connected to the rotor blade at a distance from the blade root and defines the at least one chord direction indicator direction indicative of a direction of a chord of the rotor blade at the location of the at least one chord direction indicator, by means of at least one torsion angle detection unit a torsion angle of the rotor blade is detected, by which the at least one chord direction indicator direction is rotated relative to a chord direction indicator reference direction, by means of a blade root angle detection unit a blade root angle is detected, by which the blade root is rotated relative to a blade root reference position about the longitudinal blade axis, and by means of an evaluation unit on the basis of the torsion angle and the blade root angle a pitch angle ($\theta$) of the rotor blade at the location of the at least one chord direction indicator is determined, wherein the rotor blade or at least one rotor blade portion of the rotor blade connected to the at least one chord direction indicator is produced in a or at least one mould before being connected to the at least one chord direction indicator, while the rotor blade or at least one rotor blade portion is still enclosed in the mould or the at least one mould, connecting the at least one chord direction indicator in a position, defined relative to the mould or the at least one mould, to the rotor blade or the at least one rotor blade portion, which is defined relative to the mould or the at least one mould, and wherein the blade root angle detection unit is connected to the rotor blade or the at least one rotor blade portion, at least at one of the blade root or in the area of the blade root, and is stationary relative to the torsion angle detection unit.

* * * * *